United States Patent [19]
Main

[11] 3,932,675
[45] Jan. 13, 1976

[54] METHOD FOR TIMED COOKING OF A FOOD PRODUCT

[75] Inventor: Duane C. Main, Woodridge, Ill.

[73] Assignee: General Foods Corporation, White Plains, N.Y.

[22] Filed: Oct. 25, 1974

[21] Appl. No.: 518,203

Related U.S. Application Data

[62] Division of Ser. No. 354,148, April 24, 1973, Pat. No. 3,859,644.

[52] U.S. Cl. .............. 426/233; 426/231; 426/438; 426/509
[51] Int. Cl.² .......................... A01K 43/00
[58] Field of Search ........... 426/231, 233, 438, 506, 426/509, 523; 99/334, 336, 344

[56] References Cited
UNITED STATES PATENTS

| | | | |
|---|---|---|---|
| 3,326,692 | 6/1967 | Martino et al. | 426/233 |
| 3,590,769 | 7/1971 | Ladany et al. | 99/344 X |

*Primary Examiner*—Hyman Lord
*Attorney, Agent, or Firm*—Cameron, Kerkam, Sutton, Stowell & Stowell

[57] ABSTRACT

A digital cooking timer responsive to the temperature of a cooking medium and incorporating minimum and maximum time decoders to insure that the cooking period is within a predetermined range is described. An interval timer sets up a counting period upon immersion of the product in the cooking medium but is inhibited from starting its counting function by the minimum time decoder until elapse of a fixed time period. After elapse of the fixed time period, the interval timer is enabled when and if the cooking medium reaches a predetermined temperature. The maximum time decoder provides an override control that energizes the control device after a fixed period in the absence of an energizing signal for the control device from the interval timer.

3 Claims, 3 Drawing Figures

METHOD FOR TIMED COOKING OF A FOOD PRODUCT

This is a Division of application Ser. No. 354,148, filed Apr. 24, 1973, now U.S. Pat. No. 3,859,644, issued Jan. 7, 1975.

This invention relates in general to an apparatus for controlling cooking time as a function of temperature. It is particularly adaptable to the field of deep fat frying foods and food products to a predetermined level of doneness irrespective of the initial temperature of the food when first placed in the cooking liquid. The invention may also be employed in numerous other environments and cooking processes.

BACKGROUND OF THE INVENTION

At the time of this invention, the usage of large batch cookers employing semi-automated techniques for controlling temperature and cooking duration was known. Food products could be cooked to an approximate level of doneness by controlling the temperature of the cooking environment and either signaling an operator to remove the foods after a predetermined period of time or automatically removing the foods from the environment.

Known systems for large batch cookers are not entirely satisfactory in situations where the mass and temperature of the food batches are variables. For instance, consider a food cooking process wherein the items to be cooked are placed in a cooking liquid heated to a predetermined temperature. In this instance, when the food is placed in the cooking liquid, the temperature of the liquid is reduced as a function of the mass and temperature of the food placed therein and a variable period of time is required to bring the temperature of the cooking liquid up to the required cooking temperature. This temperature recovery time period directly effects the level of doneness of the food batch which is being cooked for a predetermined period of time calculated to achieve a desired level of doneness. Hence, it is obvious that in such systems it is desirable that the foods be cooked to a desired level with degree of consistency, otherwise, the quality of the product will be a function of approximations as to cooking time arrived at by the operator.

Recent developments in the art of food cooking have attempted to overcome the various problems associated with time dependent cooking methods and apparatus as described above. These developments incorporate the concept of determining the level of doneness of the food batch as a function of the temperature of the cooking medium. The temperature of the cooking medium is monitored and when it has recovered from the temperature change induced by adding the food batch, the food batch is considered cooked. Typical methods and apparatus are described in U.S. Pat. Nos. 3,213,778; 3,281,813 and 3,326,692. Such known methods and apparatus have not proved entirely satisfactory in that they do not produce repeatable results and the quality of the food suffers due to overcooking. Excessive dehydration of the food in the cooking process may be encountered if the food is held at a temperature greater than the boiling point of water for excessive periods of time while the automatic system is waiting for the temperature of the cooking medium to reach a preset level.

Accordingly, it is a major purpose of this invention to provide an improvement in the state of cooking art which will overcome the aforesaid problems and produce an end product which is consistent and of excellent quality.

More particularly, it is a purpose of this invention to provide an improved system that will automatically compensate for temperature and mass variations of a food batch and prevent dehydration of the product caused by over-cooking at a below normal temperature.

It is a further and important purpose of this invention that the above purposes be achieved with a system that is simple, inexpensive, and reliable so that its use will be acceptable to mass producers of precooked food products and also quick service restaurants.

It is a further related purpose of this invention to provide such an improved system that acceptable repeatable results will be achieved irrespective of the capabilities of the operator.

Further objects and attendent advantages of the present invention will become more apparent as the specification is considered in connection with the appended drawings.

BRIEF DESCRIPTION OF THE INVENTION

In brief, this invention accomplishes the stated objectives through the unique combination of timing circuits and a temperature comparator.

The system incorporates a temperature comparator responsive to the output of a temperature transducer which is responsive to the temperature of the cooking medium. The temperature comparator provides a signal to a timing circuit when the temperature of the cooking medium reaches a predetermined level. This signal enables the timing circuit to start a count which after a predetermined period of time, generates an output signal that activates a completed cooking alarm.

Two additional timers are provided, their responsive counting periods being started at the beginning of the cooking cycle. The first of these additional timers provides an inhibit function to the temperature responsive timer to insure that at least a minimum amount of time has elapsed before that timer starts. The second additional timer provides a signal that activates the completed cooking alarm and turns off the apparatus to prevent over-cooking.

DESCRIPTION OF THE PREFERRED EMBODIMENT

Figure 1:
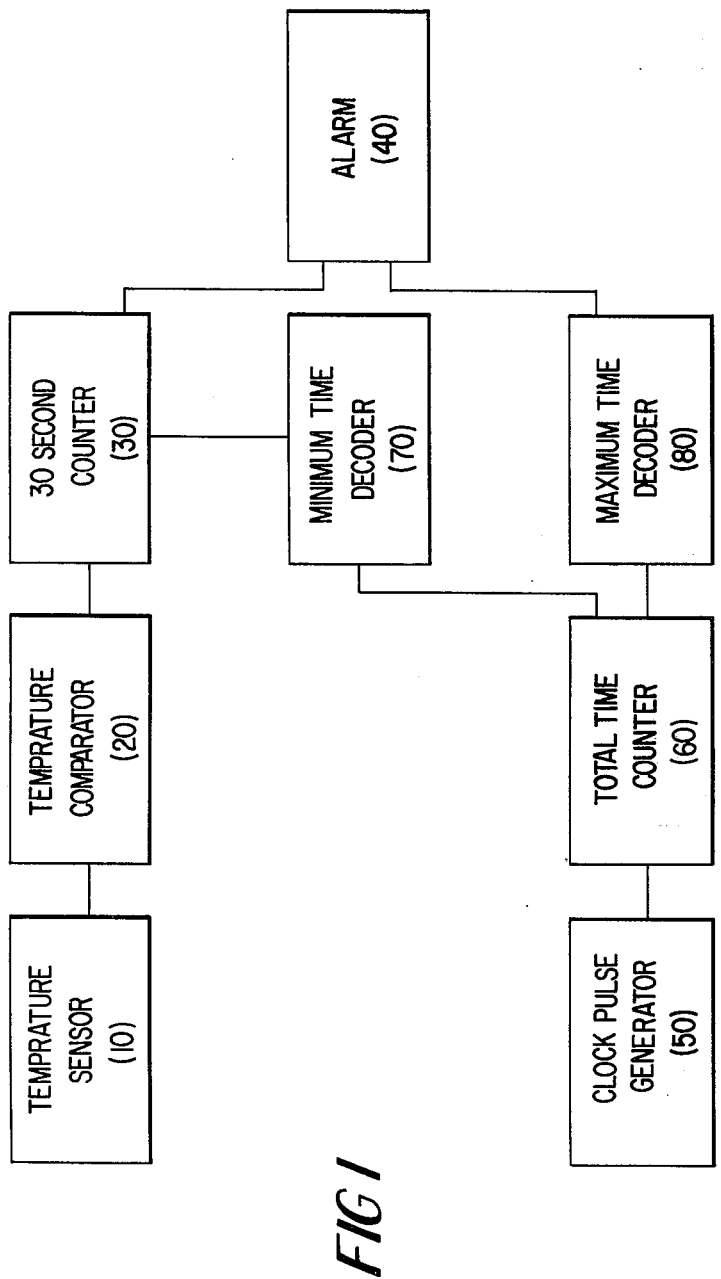
FIG. 1 is a block diagram of a preferred embodiment of this invention.

The block diagram presented in FIG. 1 illustrates a temperature sensor 10 which generates an output signal that is a function of the temperature of the cooking medium or bath. This output signal is applied to a temperature comparator 20 which incorporates an adjustable voltage divider to enable adjustment of the temperature comparator such that it will provide an output signal when the temperature of the cooking medium reaches a predetermined level. This signal activates a 30-second counter 30. When the 30-second counter 30 times out, it provides an output signal to an alarm 40 which upon energization notifies an operator that a cooking cycle has been completed.

A clock pulse generator 50 is activated at the beginning of a cooking cycle and provides output pulses at the rate of approximately one pulse-per-second to the total time counter 60. Outputs from the total time counter 60 are applied to the minimum time decoder 70 and the maximum time decoder 80. The minimum time decoder 70 provides an inhibit function to the 30-second counter 30, which prevents that counter from being activated by the temperature comparator until at least a minimum duration of time has elapsed. The maximum time decoder 80 provides a signal that overrides the timing function of timer 30 and activates the alarm 40 in the event that the temperature of the cooking medium has failed to reach a value great enough to cause the temperature comparator to activate the 30-second counter. The maximum time decoder 80 provides a safety function which prevents over-cooking in that it will energize the alarm regardless of the output of the temperature comparator or 30-second counter. This is desirable because cooking generally is taking place in the hot bath even though the temperature of the bath has not risen sufficiently after initial placement of the product in the bath to initiate operation of the 30 second counter.

Figure 2:
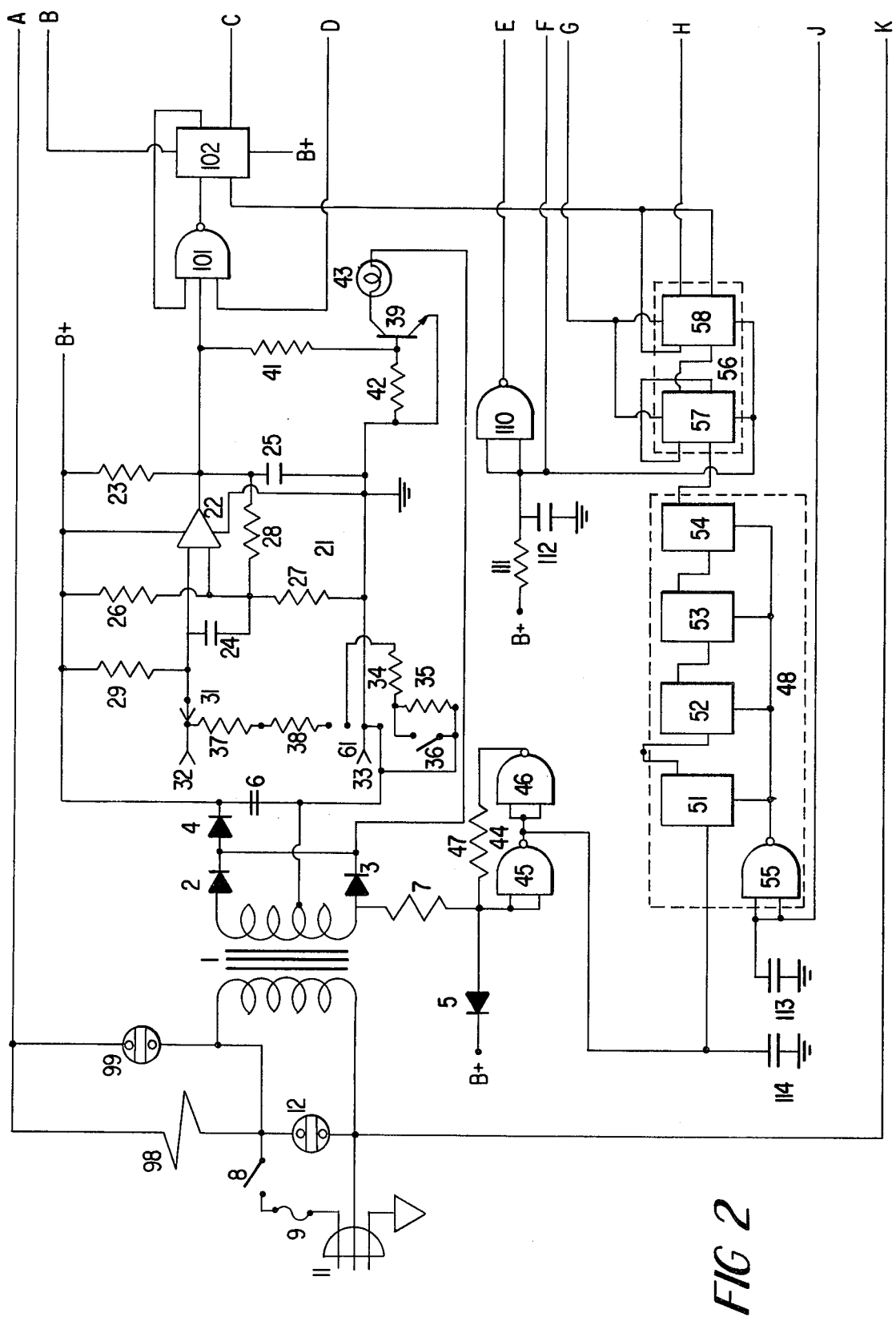
FIGS. 2 and 3 are partial electrical schematics which, when considered jointly with conductors A to K of FIG. 2 being connected to similarly marked conductors of FIG. 3, represent a preferred embodiment of this invention.

FIG. 2 schematically presents the details of the power supply, temperature comparator 20, and clock pulse generator 50.

The power supply incorporates a step-down transformer 1 and a full wave rectifier comprised of diodes 2, 3, 4, and 5, capacitor 6 and resistor 7, which cooperate to produce a positive 5 volts DC and unrectified half wave signal. The primary of the step-down transformer 1 is connected to a suitable source of AC power by an on-off switch 8, fuse 9, and receptacle 11. A power on indicator lamp 12 is connected in parallel with the primary of the step-down transformer 1.

The temperature comparator consists of a differential amplifier 21 incorporating an amplifier 22, resistor 23, capacitors 24 and 25 and two voltage divider networks. A comparison potential or voltage standard is developed across one voltage divider network comprised of resistors 26 and 27, and feedback resistor 28. This voltage standard is applied to one input of amplifier 22. A second input of amplifier 22 is connected to a voltage divider network incorporating resistor 29 and a resistance selectable by the temperature selection switch 31. The selectable portion of the voltage divider network may be a temperature responsive transducer connected to the circuit via jacks 32 and 33, or the test circuit comprised of resistances 34 and 35, and switch 36.

The temperature selection switch 31 incorporates a test position 61 with suitable jumpers which connect either the voltage divider network comprised of resistors 29, 34, and 35 or the voltage divider network comprised of resistors 26 and 27 across the B+ bus and return line to the transformer center tap. A switch 36 is provided in parallel with resistor 35 to cause a voltage level different than the voltage standard to be applied to amplifier 22. However, when the test switch 36 is closed, resistor 35 is bypassed and voltage developed by the network is equal to the voltage standard.

The temperature comparator may be made responsive to different temperatures by providing a resistance network such as resistors 37 and 38 in series with the temperature responsive transducer via the action temperature selection switch 31.

The transistor 39 is connected to the output of amplifier 22 via resistor 41. This transistor is biased by resistor 42 such that indicator lamp 43 is illuminated in response to the output of the differential amplifier.

The timing function of the system is initiated when switch 8 is closed. This action causes a positive half-wave signal to be applied to the input of Schmidt trigger 44 via resistor 7. The Schmidt trigger, formed by NAND gates 45 and 46 connected in series with feedback resistor 47, provides a positive 60 Hertz square wave at the output of NAND gate 45. This pulse train is applied to the input of divider 48.

Divider 48 is comprised of four flip-flops 51, 52, 53, and 54, and a reset NAND gate 55 which functions to convert the 60 Hertz pulse train to a 3.75 Hertz pulse train that is applied to divider 56.

Divider 56 is comprised of two flip-flops 57 and 58. It provides a clock pulse of 0.9375 Hertz to the 30-second counter and the total time counter.

Figure 3:
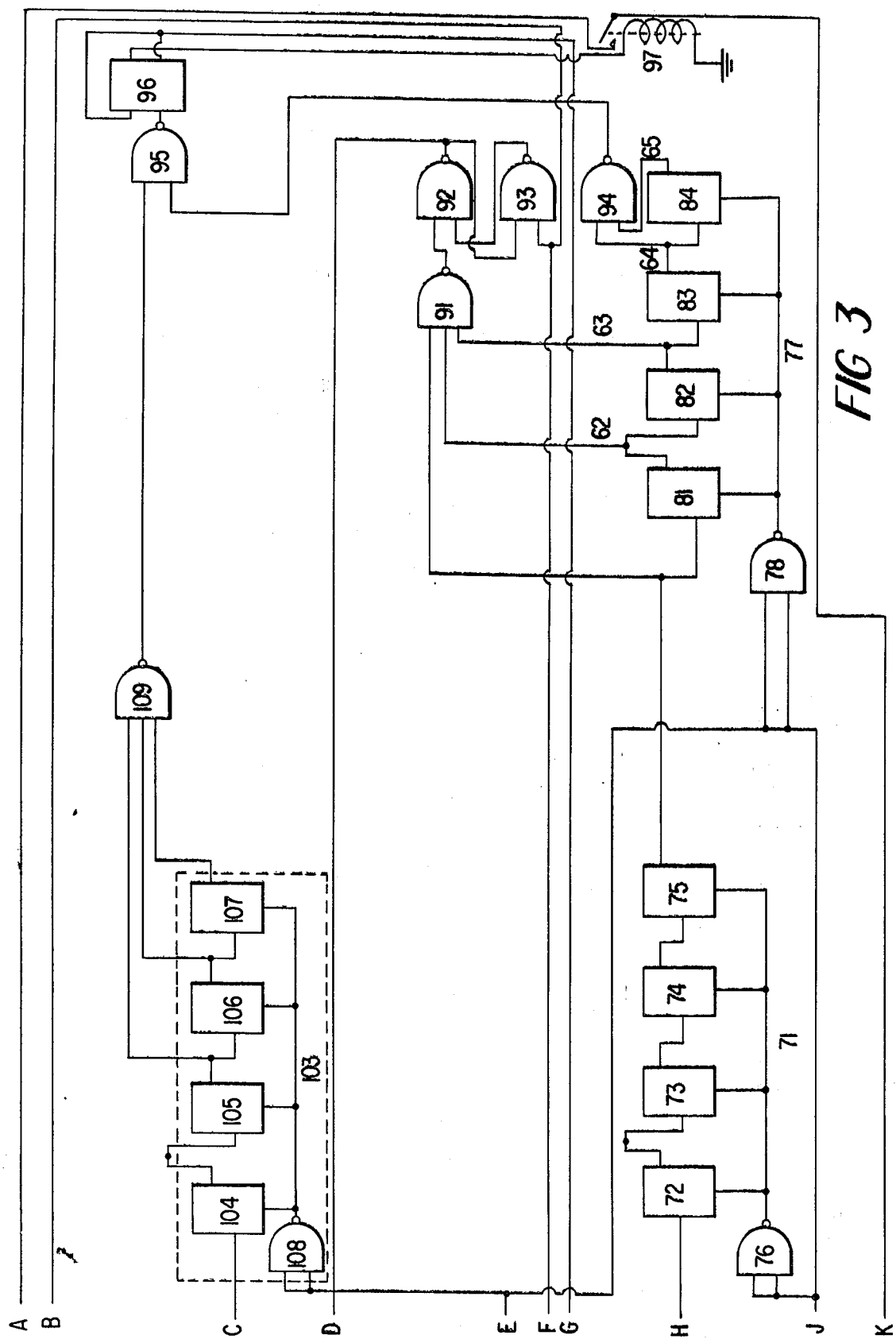

The total time counter, illustrated in FIG. 3, incorporates a counter 71 which is compressed of four flip-flops, 72 through 75 and a reset NAND gate 76. This counter produces a pulse every fifteen seconds which is applied to counter 77.

Counter 77 incorporates a reset NAND gate 78 and four flip-flops, 81 through 84 and provides output pulses every 30, 60, 120, and 240 seconds on conductor 62, 63, 64, and 65 respectively.

The minimum time decoder 70 is comprised of a three-input NAND gate 91 and two-input NAND gates 92 and 93. The three-input NAND gate 91 is trued by coincidence of a 15-second pulse from counter 71, a 30-second pulse from flip-flop 81, and a 60-second pulse from flip-flop 82. The output of NAND gate 91 triggers NAND gate 92 which provides a 1-minute pulse to the 30-second counter 30 and NAND gate 93. NAND gate 93 is trued by the output of NAND gate 92 and provides an input to NAND gate 92 which functions to hold NAND gate 92 trued.

The maximum time decoder is comprised of a two-input NAND gate 94 which is trued by the 120-second pulse produced by flip-flop 83 in coincidence with the 240-second pulse produced by flip-flop 84. The output of this gate is applied to one input of a two-input NAND gate 95. When trued by the imput from NAND gate 94, NAND gate 95 causes flip-flop 96 to change state and energize relay 97. When relay 97 is energized, its contacts complete an AC circuit through warning buzzer 98 and warning lamp 99. If desired, relay contacts may be provided and connected in circuit for terminating the heat input to the cooker.

The 30-second counter 30 incorporates a three-input NAND gate 101 which is responsive to coincident outputs of the temperature comparator differential amplifier 22, NAND gate 92 of the minimum time decoder 70, and a feedback loop from flip-flop 102. The output of NAND gate 101 is supplied to flip-flop 102, which is also responsive to the 0.9375 Hertz output of divider 56. These two pulses cause flip-flop 102 to be set and reset such that it produces an output pulse every 1.875 seconds.

The output of flip-flop 102 is applied to a four stage counter 103 which is comprised of flip-flops 104 through 107 and reset NAND gate 108. Counter 103 produces three outputs; one every 7.5 seconds, a second every 15 seconds, and a third every 30-seconds. These three outputs are applied to a three-input NAND gate 109 which provides a 30-second signal to NAND gate 95. This signal will change the state of NAND gate 95 in the same fashion as the signal provided by NAND gate 94 and cause flip-flop 96 to change state and energize relay 97 as previously described.

NAND gate 110 is responsive to the voltage developed across resistor 111 and provides a reset signal to NAND gate 55, 76, 78, and 108 when power is initially applied to the apparatus via the closing of switch 8. The positive potential which is applied to NAND gate 110 is also applied to flip-flops 57, 58 and 96 and NAND gate 93 to effect the resetting of these stages.

Capacitors 112, 113, and 114 are provided to eliminate undesirable high frequency harmonics.

The operation of the apparatus is as follows:

When a food batch is initially immersed in a preheated medium, power on switch 8 is closed and the dividers and counters are reset. The total time counter 60 begins to count in response output pulses from the clock pulse generator 50 and differential amplifier 22 is in its quiescent state. When the differential amplifier changes state in response to the voltage developed across the temperature responsive voltage divider network and the minimum time counter times out, NAND gate 101 changes state and starts the 30-second counter 30. When the 30-second counter times out, it triggers NAND gate 95, which in turn causes flip-flop 96 to change state and energize relay 97.

The total time counter continues to count concurrently with the previously described sequence and when it reaches 240 seconds, it trues NAND gate 94 which causes NAND gate 95 to change state and trigger flip-flop 96, thus precluding the possibility of the timer producing a time signal in excess of 4 minutes.

It is to be unerstood that this invention is not to be limited to the exact constructions shown and described but that various changes and modifications may be made without departing from the spirit and scope of the invention as defined in the appended claims.

It should be apparent that 30-second counter is inhibited for a period of about 60 seconds as to preclude the initiation of its count even though the temperature of the cooking medium may have reached the predetermined cooking level. On the other hand, after expiration of the 60 second inhibit period, counter 30 will not begin counting until the proper temperature is realized. Should the temperature of the cooking medium fail to rise to the predetermined level, the 4 minute maximum time decoder exercises its override function to energize the alarm means to indicate the readiness of the cooked product.

I claim:

1. A method for determining the state of readiness of a food product and indicating the completion of a cooking cycle for the product immersed in a preheated cooking medium comprising the steps of:

monitoring the temperature of the cooking medium and generating a timer control signal when said temperature reaches a predetermined level after immersion of the food product for energizing a fixed interval timer, the timing interval of which establishes a desired cooking period for the product at said predetermined temperature level, inhibiting the start of said timing interval for a fixed time period after immersion of said food product in the heated cooking medium to thereby establish a minimum cooking time for tahe product immersed in the heated cooking medium, said minimum cooking time including the total of the fixed period plus the period of the interval timer and the time necessary for the cooking medium to reach said predetermined level after completion of the inhibiting fixed period, initiating the timing of an override time period upon immersion of the food product in the cooking medium to thereby establish the maximum cooking time for the produce immersed in the cooking medium, and energizing an alarm either in response to completion of the timing interval or completion of the override time period even though the desired cooking period for the product at said predetermined temperature level has not been maintained to indicate that the product is at the desired state of readiness.

2. A method for determining the state of readiness of a food product and indicating the completion of a cooking cycle for the product as set forth in claim 1 wherein the start of said timing interval is inhibited for a period of time greater than the period of the timing interval and said override time period is greater than twice the sum of the timing interval and the inhibit period.

3. A method for determining the state of readiness of a food product and indicating the completion of a cooking cycle as set forth in claim 2 wherein said inhibit period is approximately 60 seconds, said timing interval is approximately 30 seconds and said override time period is approximately 4 minutes.

* * * * *

UNITED STATES PATENT OFFICE
CERTIFICATE OF CORRECTION

PATENT NO. : 3,932,675
DATED : January 13, 1976
INVENTOR(S) : Duane C. Main

It is certified that error appears in the above-identified patent and that said Letters Patent are hereby corrected as shown below:

Claim 1, line 19, column 6, "for tahe" should read --for the--.

Claim 1, line 28, column 6, "the produce" should read --the product--.

Signed and Sealed this fifteenth Day of June 1976

[SEAL]

Attest:

RUTH C. MASON
Attesting Officer

C. MARSHALL DANN
Commissioner of Patents and Trademarks